(12) United States Patent
Liang

(10) Patent No.: US 11,609,850 B2
(45) Date of Patent: *Mar. 21, 2023

(54) METHOD OF OPERATING A MEMORY WITH DYNAMICALLY CHANGEABLE ATTRIBUTES

(71) Applicant: Micron Technology, Inc., Boise, ID (US)

(72) Inventor: Qing Liang, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/461,603

(22) Filed: Aug. 30, 2021

(65) Prior Publication Data

US 2021/0390046 A1 Dec. 16, 2021

Related U.S. Application Data

(63) Continuation of application No. 16/685,879, filed on Nov. 15, 2019, now Pat. No. 11,119,914.

(51) Int. Cl.
*G06F 12/02* (2006.01)
*G06F 3/06* (2006.01)

(52) U.S. Cl.
CPC .......... *G06F 12/0292* (2013.01); *G06F 3/064* (2013.01); *G06F 3/0614* (2013.01); *G06F 3/0659* (2013.01); *G06F 3/0679* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| 11,119,914 B2 | 9/2021 | Liang |
| 2016/0313943 A1 | 10/2016 | Hashimoto et al. |
| 2018/0374548 A1 | 12/2018 | Achtenberg et al. |
| 2019/0303019 A1 | 10/2019 | Sonata et al. |
| 2020/0104048 A1 | 4/2020 | Habbinga et al. |
| 2021/0149798 A1 | 5/2021 | Liang |

FOREIGN PATENT DOCUMENTS

CN 112817878 5/2021

OTHER PUBLICATIONS

"Chinese Application Serial No. 202011266436.7, Voluntary Amendment Filed Sep. 8, 2021", w English Claims, 17 pgs.

*Primary Examiner* — Kevin Verbrugge
(74) *Attorney, Agent, or Firm* — Schwegman Lundberg & Woessner, P.A.

(57) ABSTRACT

A feature can be defined to allow data attributes to be dynamically assigned to data in a storage device. For example, a feature referred to as a "datagroup" is introduced. A datagroup is defined as a grouping of a range of local block addresses. A storage device can be divided into a number of datagroups. Each datagroup can have its own data attributes configuration, which can have a specified number of bits. A new command is defined to allow a host to dynamically assign attributes of datagroups of a storage device. For example, the command can provide for dynamically assigning datagroup attributes by sending a byte-mapping table in the command from the host to the storage device.

20 Claims, 10 Drawing Sheets

| BIT OFFSET | BIT 7 ~ 6 | BIT 5 | BIT 4 | BIT 3 | BIT 2 | BIT 1 | BIT 0 |
|---|---|---|---|---|---|---|---|
| DATA ATTRIBUTES | RESERVED | TEMPORARY WRITE | READ ONLY | SEQ ACCESS | FAST ACCESS | COLD | HOT |

| OFFSET | SIZE | NAME | MDV | USER CONF. | DESCRIPTION |
|---|---|---|---|---|---|
| 4Fh | 4 | dExtendedUFSFeaturesSupport | Device Specific | No | Bit[0]: FFU<br>Bit[1]: PSA<br>...<br>Bit[8]: Turbo Write<br>Bit[9]: Auto Deep Idle<br>Bit[10]: DataGroup<br>Bit[11-31]: Reserved |

DEVICE DESCRIPTOR — 935

FIG. 9

| OFFSET | SIZE | NAME | MDV | USER CONF. | DESCRIPTION |
|---|---|---|---|---|---|
| 30h | 4 | qDataGroupGranularity | Device Specific | No | Granularity of the DataGroup<br>DataGroup Size = 1MB (qDataGroupGranularity + 1) |

UNIT DESCRIPTOR — 1040

FIG. 10

METHOD OF OPERATING A MEMORY WITH DYNAMICALLY CHANGEABLE ATTRIBUTES

PRIORITY APPLICATION

This application is a continuation of U.S. application Ser. No. 16/685,879, filed Nov. 15, 2019, which is incorporated herein by reference in its entirety.

FIELD OF THE DISCLOSURE

Embodiments of the disclosure relate generally to memory systems, and more specifically, to management of data attributes in memory systems.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

BRIEF DESCRIPTION OF THE DRAWINGS

The drawings, which are not necessarily drawn to scale, illustrate generally, by way of example, but not by way of limitation, various embodiments discussed in the present document.

FIG. 9 shows an example definition of a datagroup feature support for a device descriptor, according to various embodiments.

FIG. 10 shows an example definition of datagroup granularity for a unit descriptor, according to various embodiments.

DETAILED DESCRIPTION

Figure 1:
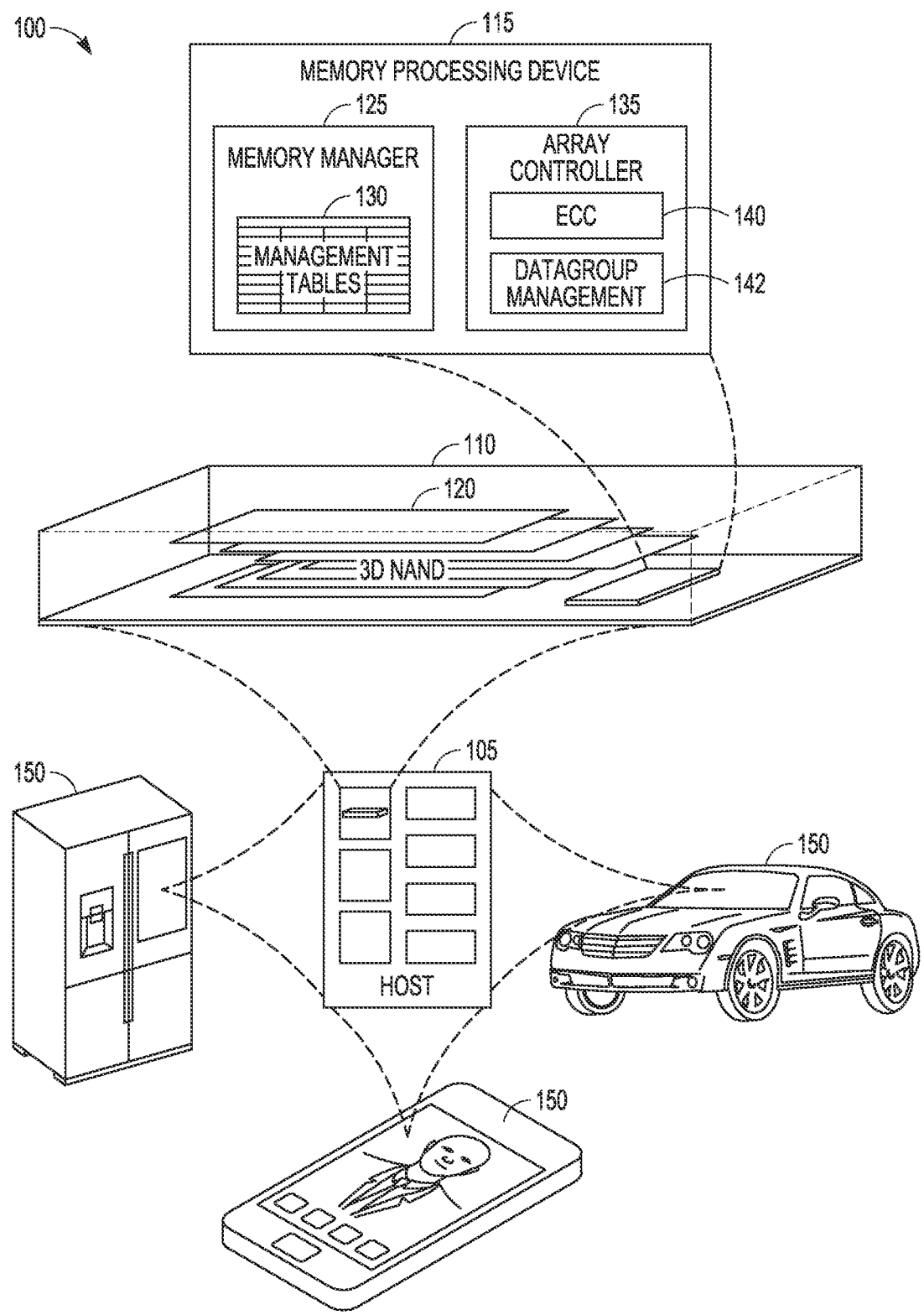
FIG. 1 illustrates an example of an environment including a memory device, according to various embodiments.

The following detailed description refers to the accompanying drawings that show, by way of illustration, various embodiments that can be implemented. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Data saved in a storage device has its own attributes. By a host passing down the data's attributes to the storage device, the host can gain better performance and longevity. In addition, by the storage device receiving this information from the host, the storage device can better manage and store the data. Data attributes can include, but are not limited to, hot or cold, fast versus slow access, sequential access versus random access, read only, and temporary write. With respect to a host and a storage device, there can be different respective characteristics of such data attributes. Cold data is data at an address that is not frequently over-written by a host. Cold data may be considered as static data such as media files, which are not often rewritten, examples of which can include, but are not limited to, an operating system (OS), video files, music files, and pictures. Hot data is data at an address that is frequently over-written by a host. Hot data, which effectively may be continuously over-written by a host, can include, for example but is not limited to, system metadata. Metadata is data that is information about other data. In various embodiments, the data temperatures can also include other temperatures such as normal, warm, and other graduations of frequency of access for rewriting.

For the hot or cold attribute, the perspective view of the host can be a frequency of overwriting and reading data, while, from the perspective view of the storage device, the hot or cold attribute can be used to separate the physical locations to improve write amplification (WA). Write amplification is a condition associated with flash memories and solid-state drives in which the actual amount of information physically written to the storage media is a multiple of the logical amount intended to be written. For the fast access versus slow access attribute, the host perspective can relate to sensitiveness of data accessing timing, while from the storage device perspective, the fast access versus slow access attribute is related to storing data in a different block type, for example, single-level cell (SLC) versus quad-level cell (QLC). For the sequential access versus random access attribute, the host perspective can relate to location of a logical block address (LBA) touching an adjacent LBA range, while from the storage device perspective, the sequential access versus random access attribute can be related to block-level versus page-level data mapping management. For the read only attribute, the host perspective can relate to operating system (OS) image binary, application execution file, or format, while from the storage device perspective, the read only attribute can be related to block-level management. For the temporary write attribute, the host perspective can relate to journaling for SQL's atomic update for example, while from the storage device perspective, the temporary write attribute can be related to a less data retention request.

An existing approach to a data stream, which is a stream identification (ID) or a group number, is to tag the data's attributes when the host initially transfers the data to the storage device. The data stream is only a static mark. The assigned data attributes cannot be changed. Unfortunately, due to the limited size of a storage device's "hot data partition," with more and more data being stored, the host may incorrectly identify some data as becoming "cold" and kick the data out from the "hot partition," while another LBA range becomes "hot," which deserves a new mark, which is not available in conventional approaches. Additionally, when originally sending out data, the host cannot predict that the data is always accessed under sequential order. Due to the observation of the location of data being accessed over a certain time, the sequential access behavior may be confirmed by the host at a later date. This LBA range should then receive a mark update, which is not available in conventional approaches.

In various embodiments, a feature can be defined to allow a host to dynamically assign data attributes. A storage device can be configured to receive a notification of dynamically assigned data attributes. For example, a feature referred to as a "datagroup" can be introduced. A datagroup is defined herein as a grouping of a range of local block addresses. A storage device can be divided into a number of datagroups. Each datagroup can have its own data attributes configuration. A data attributes configuration can include a specified number of bits. For example, the specified number of bits can be, but is not limited to, eight bits. A new command is defined herein to allow a host to dynamically assign a datagroup's attributes. For example, the command can provide for dynamically assigning a datagroup's attributes by sending a byte-mapping table in the command from the host to the storage device. The command can be defined as "Set DataGroup," though other names can be used. The granularity of a datagroup can be defined by a storage vendor according to specifications corresponding to the type of storage device. For example, in a Universal Flash Storage (UFS™) storage device, granularity can be incorporated in a UFS "Unit Descriptor." Consider, for example, a UFS device. One form of a UFS device is a 128 GB UFS. The 128 GB UFS device can be managed as having 1024 datagroups, where the datagroup granularity can be set to 128 MB. For this example, the size of a data attribute byte-mapping table for the whole device can be 1 KB bytes.

A host, using one or more processors, can perform operations to dynamically provide or update data attributes in a memory storage device. The host can assign attributes to one or more datagroups of multiple datagroups, where the multiple datagroups are contained in one or more memory devices of the data storage device. The host can encode the assigned attributes into a command and transmit the command to the data storage device. A processor device of the data storage device can operate to decode the command received from the host, where the command corresponds to one or more datagroups of the data storage device. The processor device of the data storage device can operate to perform functions in the data storage device with respect to the one or more datagroups in response to the decoding. Such functions can include reassigning data to blocks of memory in the data storage device. This command can be added to a set of commands for a host to interact with a given storage device according to the specifications for the given storage device. In addition, unused bit locations referenced in specifications of associated standards for data structures of such storage devices can be used for a host to operate with the given type of storage device to provide information, such as but not limited to data attributes, regarding the relationship of data and datagroups to the given storage device.

Memory devices can include individual memory die, which may, for example, include a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a host. In such managed memory devices the controller functionality may be implemented on one or more die also incorporating a memory array, or on a separate die. In other examples, one or more memory devices may be combined with controller functionality to form a solid-stage drive (SSD) storage volume.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a UFS device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard). Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells, to obviate internal battery supply requirements, thus allowing the drive to be more versatile and compact. Managed NAND devices can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or static random access memory (SRAM) (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations, to transfer data (e.g., user data and associated integrity data, such as error data and address data, etc.) between the memory devices and the host, or erase operations to erase data from the memory devices.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., Internet-of-Things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, ROM, an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as IoT devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of 3D NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory processing device 115 can include, among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (I/O) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. In some embodiments, the functions of the memory manager 125 are implemented by a controller (or processor) executing the instructions of firmware. For example, memory manager 125 can, in some examples, be implemented at least in part by one or more processors, for example as may be found within processing device 615 of FIG. 6, which may execute instructions stored in memory, for example, in memory 616 or one or more of the memory devices 612-1 . . . 612-N of FIG. 6. The management tables 130 can be similarly be stored on the memory processing device 115, in either of such memory device locations. In other examples the instructions and/or management tables 130 may be stored in certain blocks of the NAND die stack 120 and loaded into the working memory of memory processing device 115 during operation.

Figure 6:
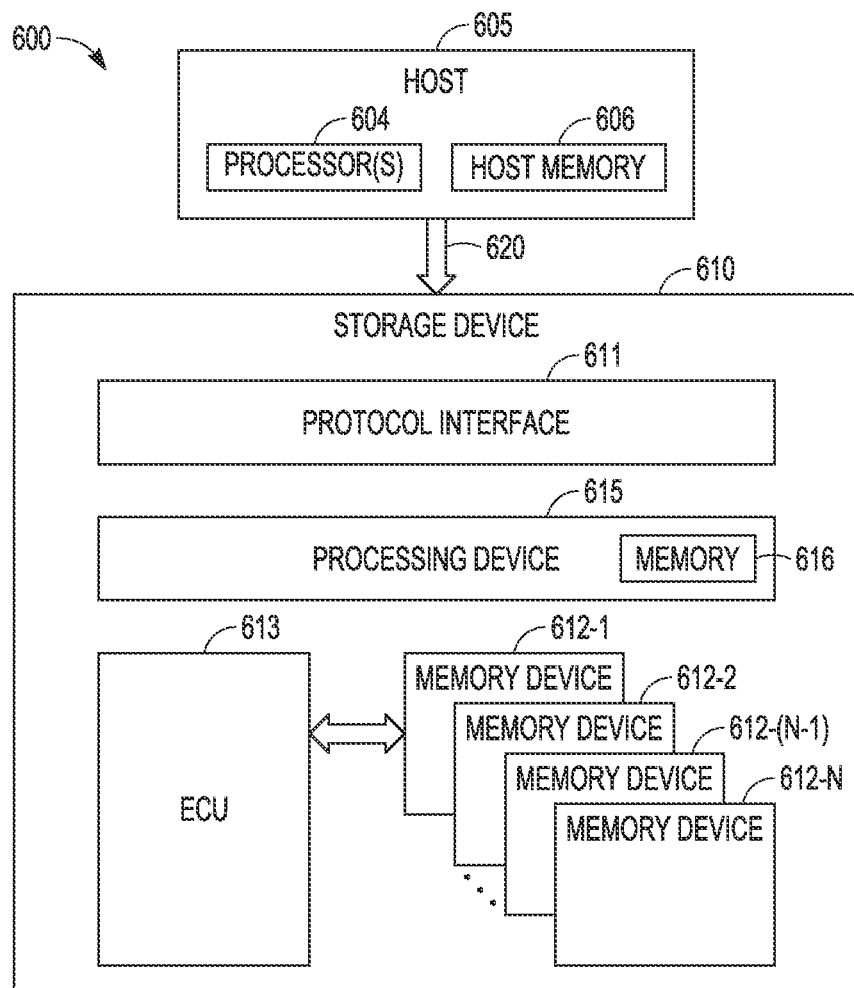
FIG. 6 is a block diagram of an example system including a host that operates with a storage device in which the host can dynamically assign data attributes to data in or being loaded into the storage device, according to various embodiments.

Those skilled in the art will recognize that, in some examples, the components and functions of memory manager 125 and array controller 135 can be implemented by any combination of components (or subsets thereof) described herein, such as processing device 615 and memory devices 612-1 . . . 612-N of FIG. 6; and may include additional hardware components.

For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory processing device 115. The array controller 135 can include a datagroup management component 142 that can include instructions for decoding commands having data attributes for datagroups. The memory processing device 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18.592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18.592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding SLC NAND flash device. As such, the MLC device may require more metadata bytes for error data than the corresponding SLC device.

Figure 2:
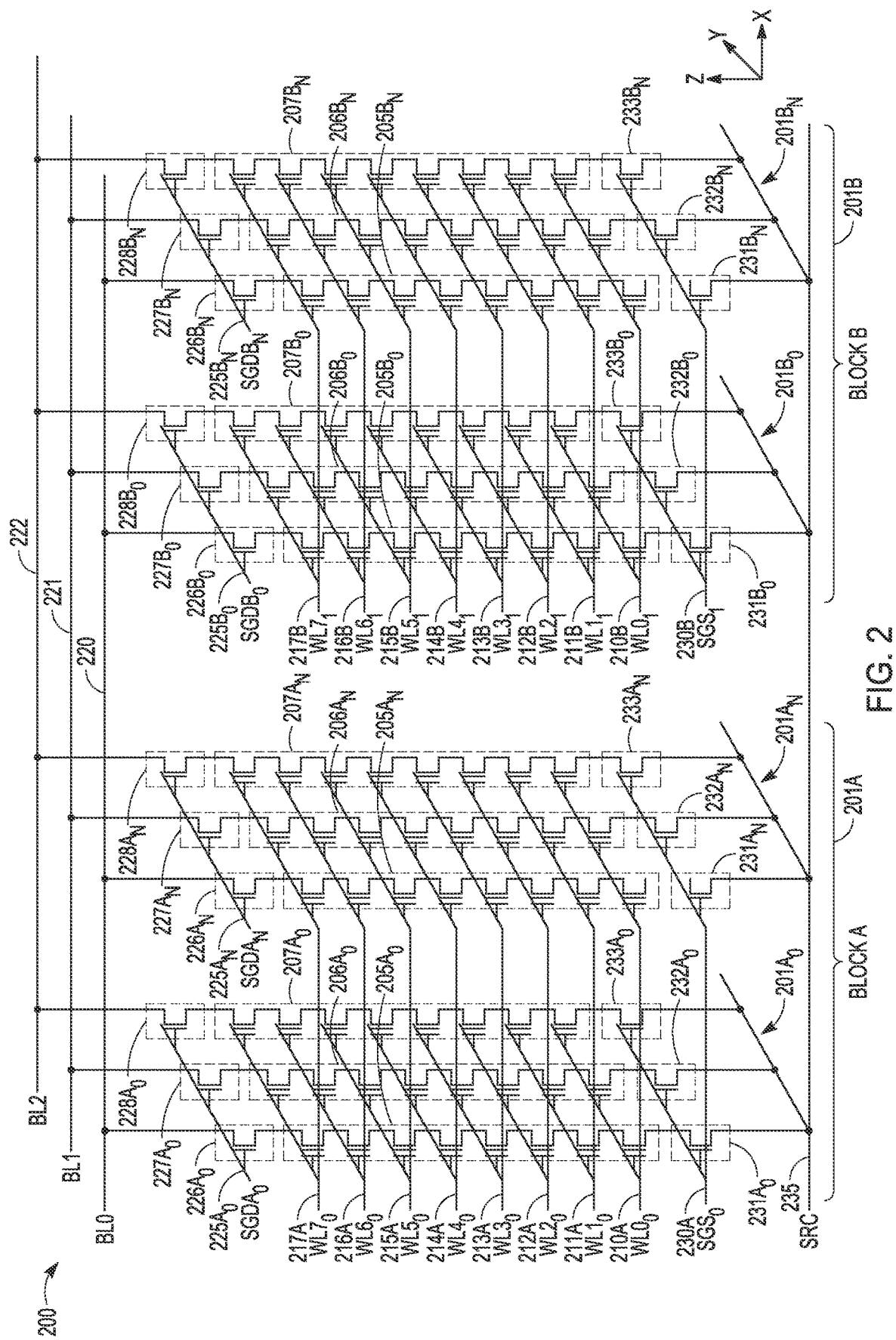
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 that can be implemented as memory array 120 of FIG. 1. The 3D NAND architecture semiconductor memory array 200 can include a number of strings of memory cells (e.g., first-third $A_0$ memory strings $205A_0$-$207A_0$, first-third $A_n$ memory strings $205A_n$-$207A_0$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ 201 $A_0$, sub-block $A_n$ 201$A_n$, sub-block $B_0$ 201$B_0$, sub-block $B_0$ 201$B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_0$ SGS $231B_0$-$233B_n$, etc.) and a drain-side select gate (SGD) (e.g., first-third $A_0$ SGD $226A_0$-$228A_0$, first-third $A_n$ SGD $226A_0$-$228A_n$, first-third $B_0$ SGD $226B_0$-$228B_0$, first-third $B_0$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, with each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18.592 bytes (B) of data per page (16.384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array 200, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_0$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_0$-$228B_0$ can be accessed using an $B_n$ SGD line $SGDB_n$ $225B_n$. First-third $A_0$ SGS $231A_0$-$233A_0$ and first-third $A_n$ SGS 231 $A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the CGs of each memory cell or select gate (or a portion of the CGs or select gates) of a respective tier of the array 200. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
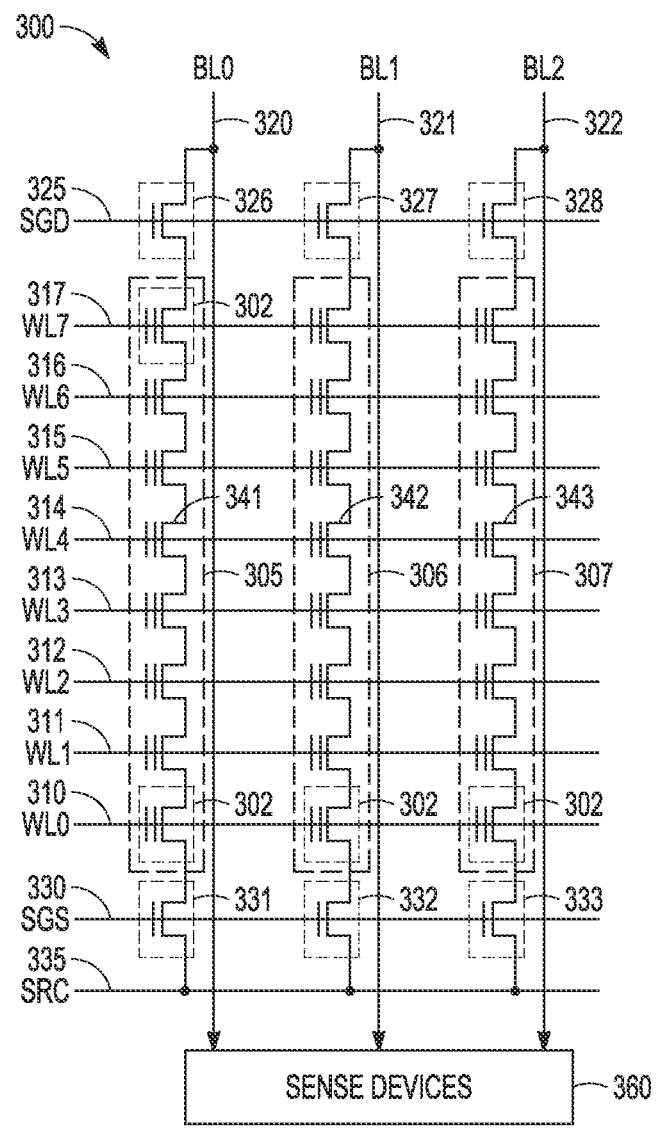

FIG. 3 illustrates an example schematic diagram of a portion of a NAND architecture semiconductor memory array 300 that can be implemented as memory array 120 of FIG. 1. The portion of the NAND architecture semiconductor memory array 300 can include a plurality of memory cells 302 arranged in a 2D array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third CGs 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or FN tunneling, etc.) from the floating gates of the targeted memory cells to the channels.

Figure 4:
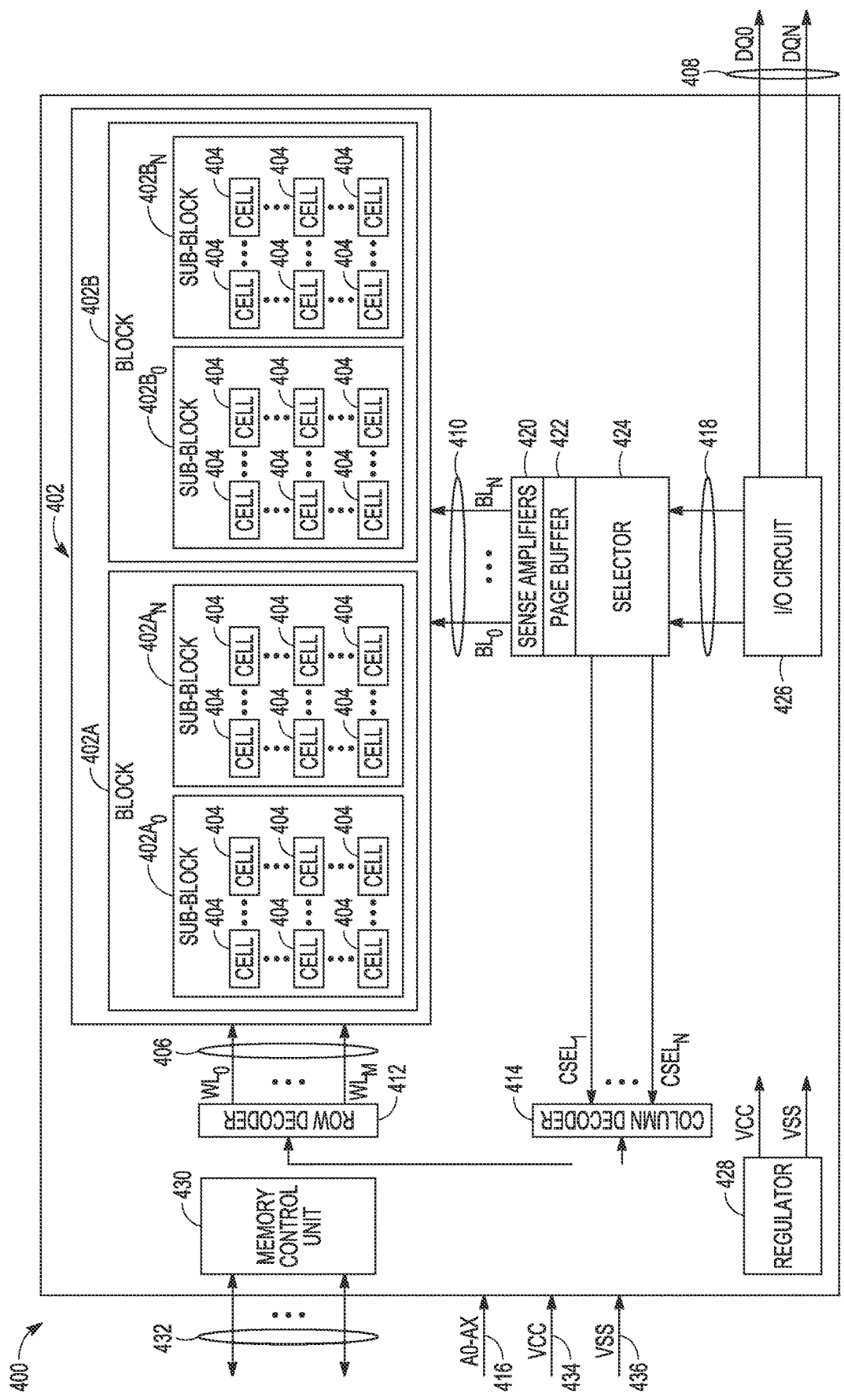
FIG. 4 illustrates an example block diagram of a memory module, according to various embodiments.

FIG. 4 illustrates an example block diagram of a memory device 400, which can be implemented in memory device 110 of FIG. 1, including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an I/O circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, with each page including a number of memory cells 404. Although illustrated herein as having two blocks, with each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432 or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The I/O circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
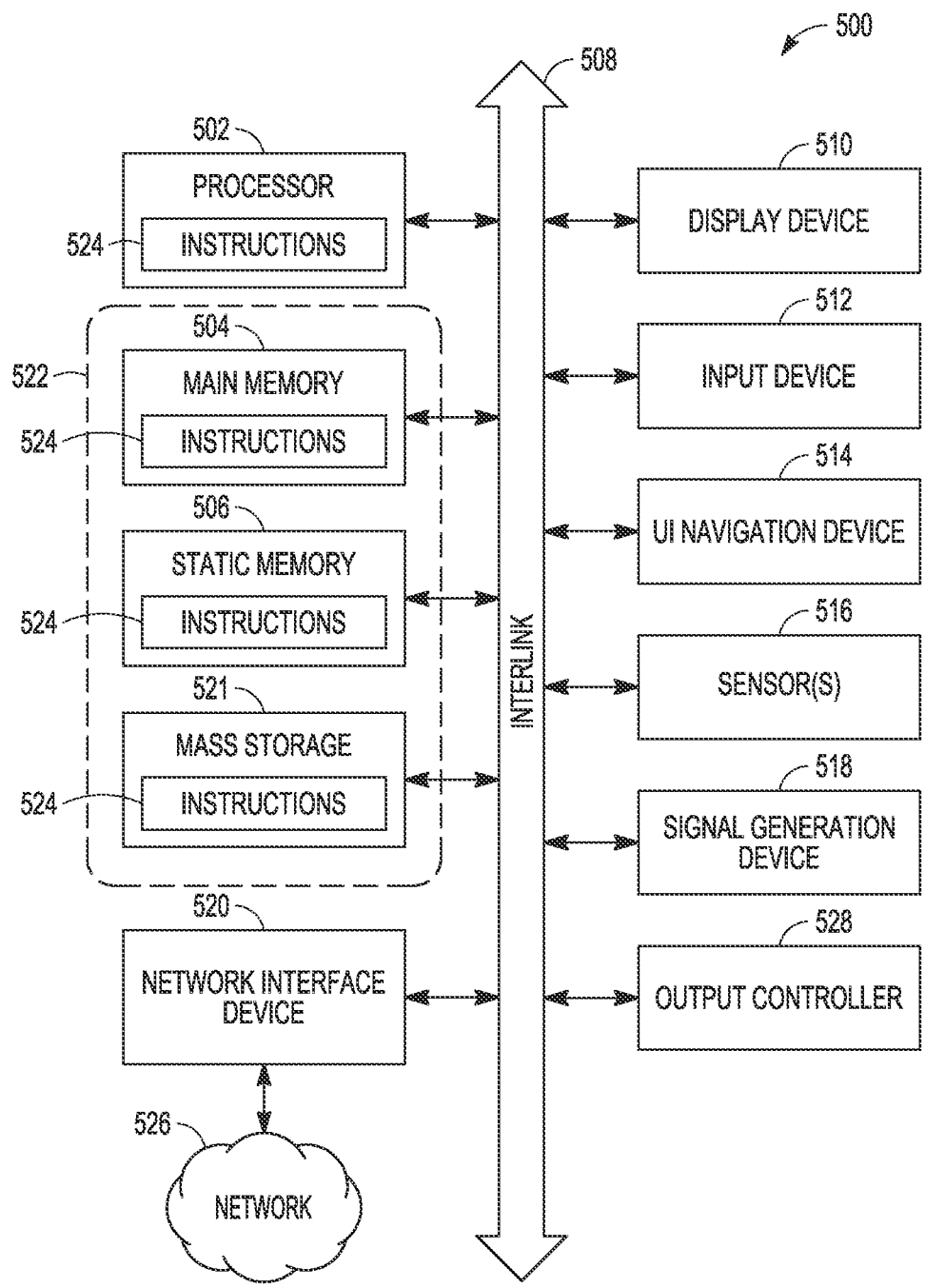
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The example machine 500 can be arranged to operate in the environment 100 of FIG. 1. The example machine 500 can include one or more memory devices having structures as discussed with respect to the memory array 200 of FIG. 2, the memory array 300 of FIG. 3, and the memory device 400 of FIG. 4.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a CPU, a GPU, a hardware processor core, or any combination thereof, such as the memory processing device 115, etc.), a main memory 504 and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512, and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., USB, parallel, or other wired or wireless (e.g., infrared (IR), near field communication (NFC), etc.) connection to communicate or control one or more peripheral devices (e.g., a printer, card reader, etc.).

The machine 500 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine-readable medium 522. The instructions 524 can include instructions for data management using datagroups. Such data management can include decoding received commands having data attributes assigned to datagroups.

While the machine-readable medium 522 is illustrated as a single medium, the term "machine-readable medium" may include a single medium or multiple media (e.g., a centralized or distributed database, or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., EPROM, EEPROM) and flash memory devices; magnetic disks, such as internal hard disks and removable disks; magneto-optical disks; and compact disc-ROM (CD-ROM) and digital versatile disc-read only memory (DVD-ROM) disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage device 521 is typically slower than the memory 504, and write speeds are typically at least twice as slow as read speeds, use of virtual memory can greatly reduce user experience due to storage device latency (in contrast to the memory 504. e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.), MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival SATA based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of storing, encoding or carrying instructions for execution by the machine 500, and includes instrumentalities to propagate digital or analog communications signals or other tangible medium to facilitate communication of such software.

FIG. 6 is a block diagram of an embodiment of an example system 600 including a host 605 that operates with a storage device 610 in which the host 605 can dynamically assign data attributes to data in or being loaded into the storage device 610. The example system 600 can be implemented with respect to the environment 100 of FIG. 1. The example system 600 can be implemented with respect to storage device 610 having one or more memory devices having structures as discussed with respect to the memory array 200 of FIG. 2, the memory array 300 of FIG. 3, and the memory device 400 of FIG. 4.

In this example embodiment, the host 605 is coupled to the storage device 610 by an interface 620. The storage device 610 can include a processing device 615 coupled to memory devices 612-1 . . . 612-N, where N is an integer equal to or greater than 1. A bus, not shown in FIG. 6, can be used to couple the processing device 615 to the memory devices 612-1 . . . 612-N. The memory devices 612-1 . . . 612-N can be NAND memory devices. Though four memory devices are shown in FIG. 6, the storage device 610 can be implemented with less or more than four memory devices, that is storage device 610 can comprise one or more memory devices. The memory devices can be realized in a number of formats including, but not limited to, multiple memory dies. The processing device 615 can include or be structured as one or more processors such as, but not limited to, a CPU. The processing device 615 can be structured as one or more memory controllers.

In the example system 600, the processing device 615 is configured (e.g., hardware and/or software implementation) to perform operations with respect receiving and using data attributes dynamically assigned to data in the storage device 610 according to methods described herein, including methods associated with FIGS. 7-13. For example, the processing device 615 can store instructions for operating on data attributes as described herein. The instructions can be stored in a memory 616 or in components of the storage device 610 external to the processing device 615. The memory 616 or the processing device 615 can comprise code executable by the processing device 615 to at least manage the memory devices 612-1 . . . 612-N. The memory 616 can include firmware containing the instructions. Alternatively, the firmware can reside in a memory device, separate from the memory devices 612-1 . . . 612-N, of the storage device 610 coupled to the processing device 615. The firmware can include code having instructions, executable by the processing device 615, to operate on the memory devices 612-1 . .

. 612-N. The instructions, executable by the processing device 615, can include instructions to execute processing of data attributes for data programmed or being programmed into memory devices 612-1 . . . 612-N of the storage device 610, as taught herein.

The system 600 and its components can be structured in a number of different arrangements. For example, the system 600 can be arranged with a variation of the type of components that comprise the host 605, the interface 620, the storage device 610, the memory devices 612-1 . . . 612-N, and the processing device 615. The host 605 can comprise one or more processors, which can vary in type. The interface 620 can be arranged as, but not limited to, a PCIe interface. The storage device 610 can be structured as, but not limited to, a SSD, a UFS device, or a eMMC device. For example, the storage device 610 can be structured as a mobile storage device. The storage device 610 can be structured as a managed NAND system. The memory devices 612-1 . . . 612-N can be NAND memory devices. The processing device 615 can include or be structured as one or more types of processors compatible with the memory devices 612-1 . . . 612-N.

The storage device 610 can include a protocol interface 611 to interpret input received from the interface 620 coupled to the host 605. The protocol interface 611 can include hardware and instructions to be complied with for exchanging information between host 605 and storage device 610, which instructions provide a specification that defines how data is delivered and interpreted. The protocol interface 611 can be arranged for UFS protocols, eMMC protocols, or other protocols. The storage device 610 can include an error correct unit (ECU) 613 configured to detect or correct errors associated with writing data to or reading data from storage device 610.

In various embodiments, the processing device 615 can have stored instructions in memory 616, such as a microcode, executable by the processing device 615, to operate on the memory devices 612-1 . . . 612-N of storage device 610, where the memory devices 612-1 . . . 612-N contain multiple datagroups with a datagroup being a grouping of a range of LBAs. The instructions can be permanently stored in processing device 615 realized as a controller. Alternatively, the instructions can be stored on a memory die of the memory devices 612-1 . . . 612-N and loaded into memory 616 of the processing device 615 at start-up/initialization, where memory 616 can be realized, in some examples, as an SRAM. The instructions can be executed to perform operations to: decode a received command corresponding to one or more datagroups of the multiple datagroups of the storage device 610 and perform functions with respect to the one or more datagroups in response to the decoding. The functions can include reorganizing the storage of some data in the storage device 610 in response to determining attributes of data stored in the storage device 610. The actions can be response to a determination of a change in one or more attributes of particular data.

Variations of the instructions for operating the storage device 610 can include a number of different embodiments that may be combined depending on the application of such instructions and/or the architecture of systems in which such instructions are implemented. Such instructions, which when executed by processing device 615, can cause performance of operations, which operations can include operating with respect to receiving a command from a host such as the host 605. As the host utilization of data changes, characterization of the data in storage device 610 changes. This change in characterization can be realized by re-assigning attributes to datagroups. For example, data can change from being hot data to cold data. The host, such as host 605, can re-assign attributes to datagroups and send the new attributes to the storage device, which allows the storage device to map memory based on the new reallocation of hot data and cold data, for example. The received command having other attribute changes to datagroups allows the storage device 610 to dynamically change attributes associated with data in the storage device 610 such that the storage device 610 can efficiently maintain its stored data.

The received command can be a request for the storage device 610 to receive a datagroup attribute table. The datagroup attribute table can include a listing of a complete set of datagroups, a number of which can have updated attributes. The received command can include data attributes for the multiple datagroups. In various embodiments, the received command from the host 605 can include a data structure for each datagroup of a specified number of datagroups, where the data structure identifies at least one attribute for a respective datagroup. This data structure can include multiple bit locations corresponding to multiple respective attributes. The data structure can comprise one byte having one bit location assigned to one attribute. In various embodiments, the data structure can include six bit locations with a bit location to identify a temporary write attribute, a bit location to identify a read only attribute, a bit location to identify a sequential access attribute, a bit location to identify a fast access attribute, a bit location to identify a cold attribute, and a bit location to identify a hot attribute.

Such instructions, which when executed by processing device 615, can cause performance of operations, which operations can include performing functions to store a mapping table decoded from the received command, with the mapping table being an assignment of attributes to the multiple datagroups. Operations can include extracting, from a first received data structure, an indicator that the system 600 supports a datagroup protocol. Operations can include extracting, from a second received data structure, an indicator of datagroup granularity.

The host 605 can construct and transmit commands to dynamically provide data attributes to data stored in the storage device 610. The host 605 can include one or more processors 604 and host memory 606. The one or more processors 604 can be configured to execute instructions stored in host memory 606 or on one or more components in the host 605, which instructions, when executed by the processor 604, cause the system 600 to perform operations. The operations can comprise assigning attributes to one or more datagroups of multiple datagroups, where the multiple datagroups are contained in one or more memory devices of the data storage device 610. The operations can also comprise encoding the assigned attributes into a command, and transmitting the command to the data storage device.

The command transmitted from the host 605 to the storage device 610 can include a data structure for each datagroup of a specified number of datagroups. The data structure can identify an attribute for the respective datagroup, and the data structure can have multiple bit locations corresponding to multiple attributes. The data structure can comprise one byte having one bit location assigned to one attribute.

Variations of the instructions for operating the host 605 can include a number of different embodiments that may be combined depending on the application of such instructions and/or the architecture of systems in which such instructions are implemented. Such instructions, which when executed by the one or more processors 604, can cause performance of operations, which operations can include transmitting a first data structure identifying that the data storage device supports a datagroup protocol. The operations can include transmitting a second data structure identifying granularity of the datagroup.

Figures 7, 8:
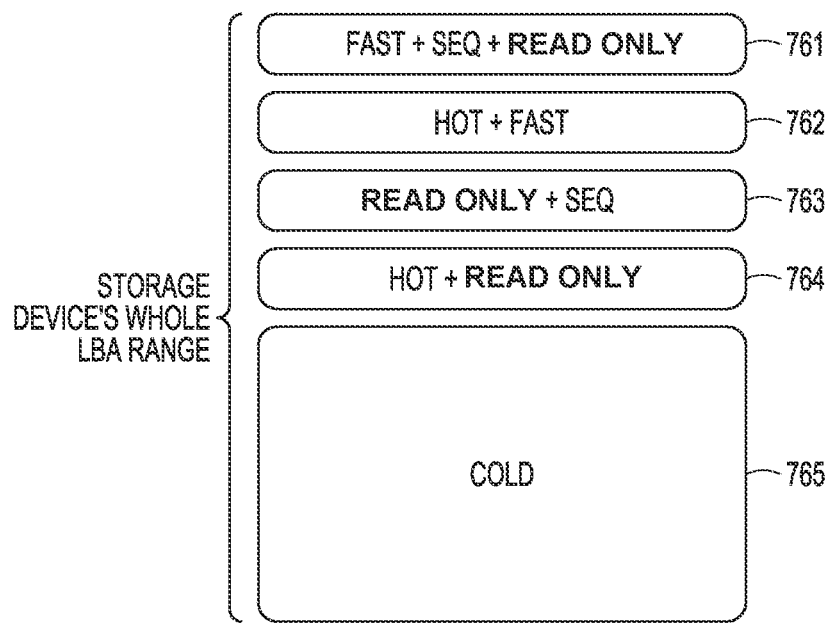
FIG. 7 illustrates a data storage device divided into several datagroups, according to various embodiments.
FIG. 8 shows an example data attributes configuration, according to various embodiments.

FIG. 7 illustrates a data storage device divided into several datagroups. The storage device can be implemented similar to the storage device 610 of FIG. 6. In this example, the data storage device's whole LBA range are divided into datagroups 761-765. The datagroup 761 includes the attributes of fast access, sequential access, and read only. The datagroup 762 includes the attributes of hot and fast access. The datagroup 763 includes the attributes of read only and sequential access. The datagroup 764 includes the attributes of hot and read only. The datagroup 765 includes the attribute of cold. These datagroups 761-765 and their attributes are a non-limiting example as a data storage device can include more datagroups with attributes assigned that are different from the datagroups 761-765 of FIG. 7. Consider, for example, a UFS device structured as a 128 GB UFS. The 128 GB UFS device can be managed as having 1024 datagroups, where the datagroup granularity can be set to 128 MB. For this example, the size of a data attribute byte-mapping table for whole device can be 1 KB bytes. The storage device 610 of FIG. 6 can be arranged as containing multiple datagroups. Such multiple datagroups can include the whole LBA range of storage device 610.

FIG. 8 shows an embodiment of an example data attributes configuration 830. The data attributes configuration 830 can be implemented for a host-storage device arrangement similar to the host 605 and the storage device 610 of FIG. 6. This configuration can be used as a data structure that can be included in a command to a data storage to update the data storage with the attributes for data stored in the data storage device. For example, the command with one or more data structures for the datagroups of the storage device 610 of FIG. 6 can be constructed and sent from the host 605 of FIG. 6 to storage device 610.

In various embodiments, the data attributes configuration 830 can be an 8-bit construct. The data attributes configuration 830 can include a bit 0 being designated to identify whether or not the data has a hot attribute. The data attributes configuration 830 can include a bit 1 being designated to identify whether or not the data has a cold attribute. The data attributes configuration 830 can include a bit 2 being designated to identify whether or not the data has a fast access attribute. The data attributes configuration 830 can include a bit 3 being designated to identify whether or not the data has a sequential attribute. The data attributes configuration 830 can include a bit 4 being designated to identify whether or not the data has a read only attribute. The data attributes configuration 830 can include a bit 5 being designated to identify whether or not the data has a temporary write attribute. Bit locations 6 and 7 of the data attributes configuration 830 can be reserved for other or future uses.

The bit locations are fields containing data representing information in a data structure. A value of one in a bit location of the data attributes configuration 830 can be used to identify that the respective datagroup has the attribute designated for that bit location. Alternatively, a value of zero in a bit location of the data attributes configuration 830 can be used to identify that the respective datagroup has the attribute designated for that bit location. A datagroup can have multiple attributes, but may typically not have attributes that are contrary attributes. For example, a datagroup typically will not have a cold attribute and a hot attribute, unless such assignment of both cold and hot attributes is used to identify another attribute or condition for the datagroup. The bit location to attribute designation can be structured with allocation of attributes to bit locations in a manner different from the data attributes configuration 830, which may depend on the type of memory devices used in the storage device. Though the data attributes configuration 830 shows an 8-bit configuration, a data attributes configuration can have more or less than 8 bits.

Figure 11:
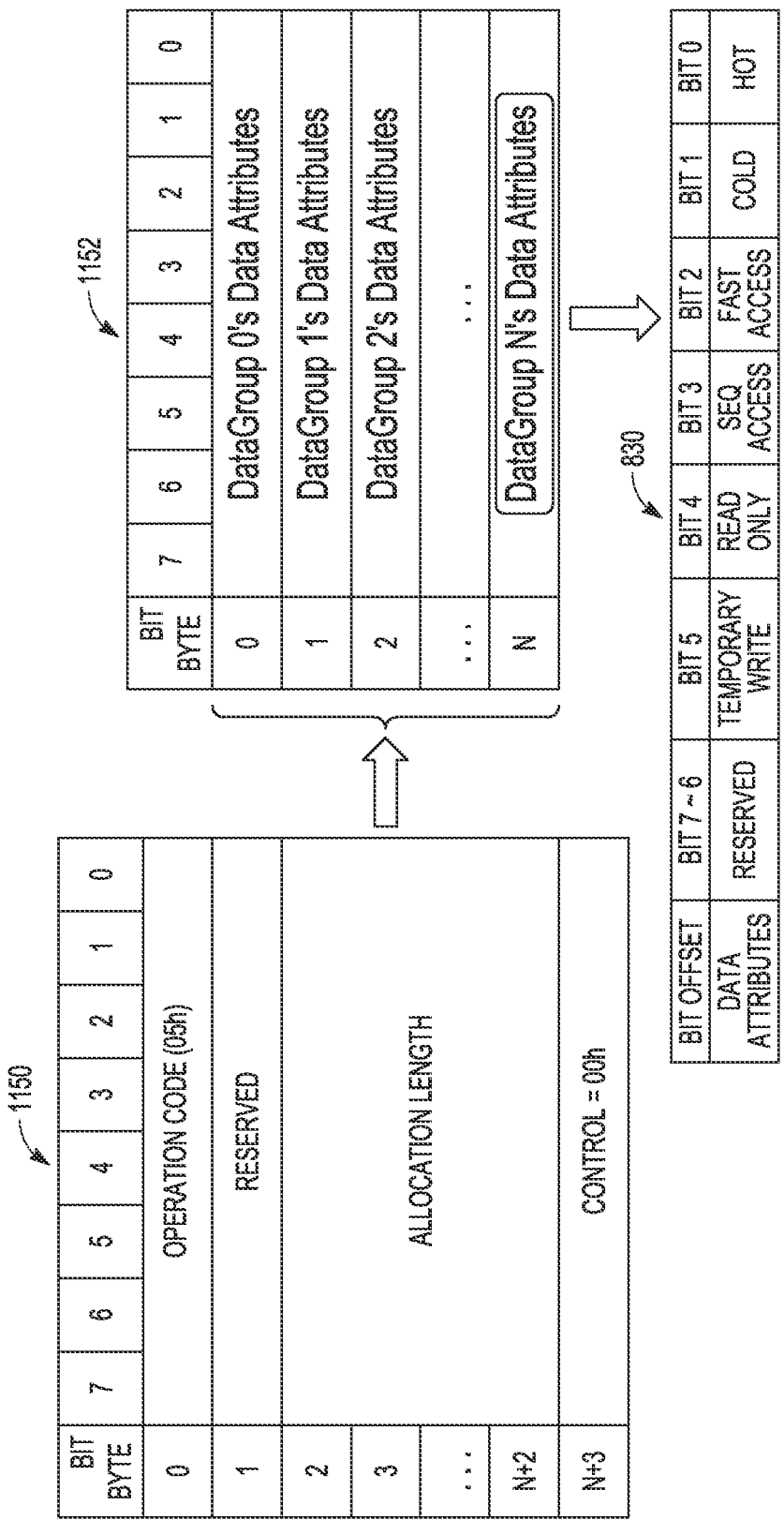
FIG. 11 illustrates an example protocol definition for use of a command directed to datagroups in a universal flash storage device, according to various embodiments.

The designation of attributes to data can be used with different types of memory devices. In addition, associated with a given type of memory device, there can be additional data structures associated with sending a data attribute from a host to a storage device. FIGS. 9, 10, and 11 show embodiments of data structures associated with datagroups for a UFS storage device. Similar approaches can be constructed for other types of storage devices.

For a UFS device, information transfer, which is a communication between a host and device, is performed through messages, which are called UFS Protocol Information Units (PIU). These messages are UFS defined data structures that contain a number of sequentially addressed bytes arranged as various information fields. For example, command structures consist of command descriptor blocks (CDB) that contain a command opcode and related parameters, flags and attributes. The command transaction originates in an initiator device and is sent to a logical unit within a target device. For enumeration and configuration, UFS based apparatus support a system of descriptors, attributes and flags that define and control the specifics of the device, including operating characteristics, interfaces, number of logical units, operating speeds, power profiles, etc. The system is a hierarchical tree of related elements.

Queries are used to read and write data structures between a host and a UFS device. This data is different from normal device reads or writes in that the data is considered system data, configuration data, production information, descriptors, special parameters and flags and other similar data. For UFS apparatus, the query function will generally be used to read or write descriptors, attributes and flags. There is also a range of vendor-specific operations that can be used to transfer vendor-specific data between the host and the UFS device. These items can reside within the UFS device memory and can be used by the UFS device to control or define its operation.

A descriptor is a block or page of parameters that describe something about the UFS device that is the subject of the descriptor. A descriptor is a data structure with a defined format. There are a number of descriptors, for example, a device descriptor, a configuration descriptor, a unit descriptor, and other descriptors. An attribute is a single parameter that represents a specific range of numeric values that can be set or read. This value can be represented as a byte or word or floating point number. Attribute size can range from 1-bit to a higher number of bits such as a 32-bit size. Attributes of the same type can be organized in arrays, where each element of the attribute array can be identified by an index.

A flag is a single Boolean value that represents a true or false. '0' or '1', on or off type of value. A flag can be cleared or reset, set, toggled or read. Flags are useful to enable or disable certain functions or modes or states within the device.

FIGS. 9 and 10 show an embodiment of example protocol definitions for use of datagroups in a UFS storage device. A UFS storage device using these protocols can be implemented in the storage device 610 of FIG. 6 with these protocols used in the host 605 of FIG. 6. FIG. 9 shows an embodiment of an example definition of a datagroup feature support for a device descriptor 935. The device descriptor 935 includes a parameter for offset, size, name, MDV, user configuration, and description. The offset provides a location for the information from the beginning of a specified memory or buffer area of the device. The value of the offset can be in bytes. In this example, the offset is set to 4 Fh. The size parameter is a value that identifies a number of bytes used in the description. In this example, the description uses 4 bytes, which is 32 bits. The name parameter provides a value that identifies the type of information, which in this example, is defined as an extended UFS feature support. The parameter MDV (Manufacturer Default Value) specifies parameter values after device manufacturing, which in this example is a device specific value. The user configuration parameter provides a value that identifies whether this information is user configured, which for the extended UFS feature support, is a value that defines that there is no user configuration. The description parameter has a number of bytes, as set in the size parameter, with a defined format. The definition for the datagroup feature support uses a bit location in the description section, which is not currently used in the UFS standards, to identify that the feature support is for a datagroup. The identification for datagroup is in bit location 10 of a 32-bit data structure for the description. In addition to bit 10 allocated for datagroup in this protocol definition, bit 0 is for FFU (Field Firmware Update), bit 1 is for PSA (Production State Awareness), bit 8 is for turbo write, bit 9 is for auto deep idle, and bits 11-31 are reserved. The status provided in the description data structure for FFU, PSA, turbo write, and auto deep idle are currently used in UFS devices. The datagroup feature support, as taught herein, can be added to the protocol for a UFS device with the datagroup parameter.

FIG. 10 shows an embodiment of an example definition of datagroup granularity for a unit descriptor 1040. Similar to the device descriptor 935, the unit descriptor 1040 includes a parameter for offset, size, name. MDV, user configuration, and description. In this example, the offset is set to 30h. The description section of the unit descriptor 1040 has a length of 4 bytes as identified by the size parameter. The name parameter has a value that identifies the type of information, which in this example, is defined as datagroup granularity. The MDV parameter identifies a device specific status and the user configuration parameter identified that there is no user configuration. The description parameter has a value that identifies the granularity of the datagroup. In this example, the datagroup size is set equal to 1 MB, which can be given as dDataGroupGranularity+1. The datagroup granularity, as taught herein, can be added to the protocol for a UFS device with the datagroup parameter.

FIG. 11 illustrates an embodiment of an example protocol definition for use of a command directed to datagroups in a UFS storage device. A UFS storage device using this protocol can be implemented in the storage device 610 of FIG. 6 with this protocol used in the host 605 of FIG. 6. FIG. 11 shows a definition for a "Set DataGroup" UFS command in a CDB 1150. The Set DataGroup UFS command requests that the device server receive attributes of selected datagroups of the UFS storage device. The selected datagroups can be the complete set of datagroups of the UFS storage device, in which case the Set DataGroup UFS command results in the device server receiving attributes of the whole datagroup in an attribute byte-mapping table from the application client. In a UFS client-server model, the device server is the UFS storage device and the client is a host device that interfaces with the UFS storage device. The Set DataGroup UFS command is generated as a Set DataGroup UFS CDB 1150. The Set DataGroup UFS CDB 1150 is a block having an operation code entry, entries for a number. N+1, of datagroup attributes, and additional entries such as a reserved entry and a control entry. The entries for the N+1 datagroup attributes is referred to as the allocation length. Each entry can have a size of one byte. Other sizes can be used in a definition of such a command. In this example, the operation code is defined as 05h and the control is defined as 00h. Each entry can be assigned to a byte location in the block of the Set DataGroup UFS CDB 1150. With the allocation length equal to N+1, corresponding to a number of datagroups of the UFS storage device, the Set DataGroup UFS CDB 1150 can have a block size of N+3 entries in the example of FIG. 11.

FIG. 11 also illustrates a Set DataGroup parameter list 1152 for the allocation length of the UFS CDB 1150 of FIG. 11. The Set DataGroup parameter list 1152 has N+1 entries, where each entry is an 8-bit data structure. The entries can be defined to have more or less than 8 bits in a data structure. The N+1 entries correspond to N+1 datagroups selected from the datagroups of the UFS device that is to receive the Set DataGroup UFS command. An entry of the N+1 entries is a data structure for one of the selected datagroups in which the data attributes of the selected one datagroup is set or updated.

In FIG. 11, a data attributes definition for the entries of the Set DataGroup parameter list 1152 is illustrated. The data attributes definition can define a data structure for the attributes of the entries of the Set DataGroup parameter list 1152. The data structure can be, but is not limited to, an 8-bit structure. The data structure of each entry for the Set DataGroup parameter list 1152 can be defined as bits 0-7 of the data attributes configuration 830 of FIG. 8. As previously noted, the data structure from the data attributes configuration 830 can include a bit 0 being designated to identify whether or not the data has a hot attribute, a bit 1 being designated to identify whether or not the data has a cold attribute, a bit 2 being designated to identify whether or not the data has a fast access attribute, a bit 3 being designated to identify whether or not the data has a sequential attribute, a bit 4 being designated to identify whether or not the data has a read only attribute, and a bit 5 being designated to identify whether or not the data has a temporary write attribute, with bit locations 6 and 7 reserved for other or future uses. The allocation of attribute to bit location can be implemented with a different allocation from that of data attributes configuration 830, though whatever allocation is used, the allocation is a defined format for a host-storage device communication.

The protocol definitions of DataGroup feature support, DataGroup granularity, and Set DataGroup Command associated with FIGS. 9, 10, and 11 are for a UFS device that can be operated under UFS standards. Similar protocol definitions can be defined for other types of data storage devices, where such protocol definitions can be applied with the other type of data storage devices operating under standards for the respective type.

Figure 12:
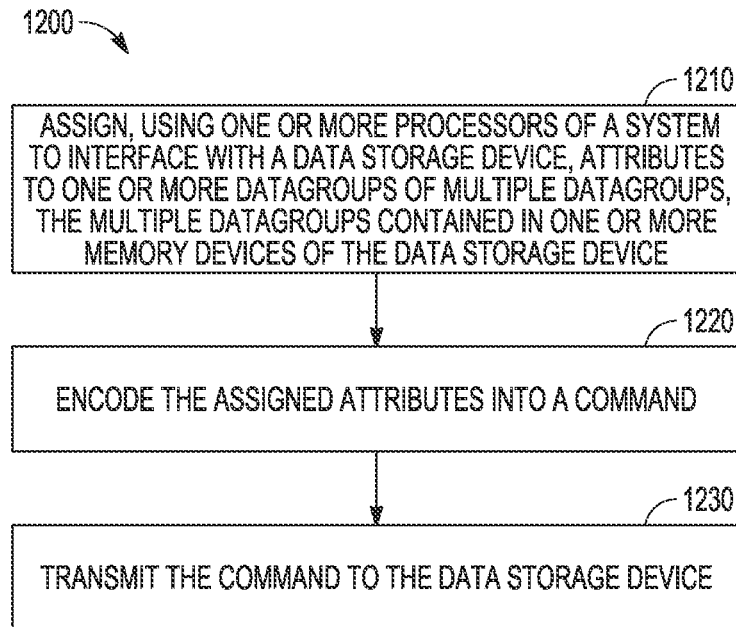
FIG. 12 is a flow diagram of an example method of dynamically updating data information to a data storage system from a system that interfaces with the data storage device, according to various embodiments.

FIG. 12 is a flow diagram of an embodiment of an example method 1200 of dynamically updating data information to a data storage system from a system that interfaces with the data storage device. The system, which interfaces with the data storage device, can include a processor configured to execute instructions stored on one or more components in the system. The system can be a host having one or more processors and host memory to operate with respect to the data storage system, such as the host 605, the processor(s) 604, and the host memory 606 of FIG. 6. At 1210, attributes to one or more datagroups of multiple datagroups are assigned, where the multiple datagroups are contained in one or more memory devices of the data storage device such as the storage device 610 of FIG. 6. A datagroup is a grouping of a range of local block addresses. At 1220, the assigned attributes are encoded into a command. At 1230, the command is transmitted to the data storage device.

Variations of method 1200 or methods similar to the method 1200 can include a number of different embodiments that may be combined depending on the application of such methods and/or the architecture of systems in which such methods are implemented. Such methods can include the command structured to include a data structure for each datagroup of a specified number of datagroups, where the data structure identifies an attribute for the respective datagroup. The data structure can have multiple bit locations corresponding to multiple attributes. In various embodiments, the data structure can comprise one byte having one bit location assigned to one attribute.

Variations of method 1200 or methods similar to the method 1200 can include a number of operations related to datagroups and transmission regarding information of the datagroups. The operations can include transmitting a first data structure identifying that the data storage device supports a datagroup protocol. The operations can include transmitting a second data structure identifying granularity of the datagroup. Variations of method 1200 or methods similar to the method 1200 can include performing other operations associated with a system that interfaces with the data storage device with respect to datagroups as taught herein.

In various embodiments, a system to interface with a data storage device can comprise a processor configured to execute instructions stored on one or more components in the system, which instructions, when executed by the processor, cause the system to perform operations. The operations can comprise assigning attributes to one or more datagroups of multiple datagroups, where the multiple datagroups are contained in one or more memory devices of the data storage device to which the system interfaces. A datagroup is a grouping of a range of local block addresses. The operations can comprise encoding the assigned attributes into a command and transmitting the command to the data storage device.

Variations of such a system to interface with a data storage device or similar systems to interface with a data storage device can include a number of different embodiments that may be combined depending on the application of such systems and/or the architecture in which such systems to interface with a data storage device are implemented. Such systems can include a processor of such systems to execute an instruction that generates the command to include a data structure for each datagroup of a specified number of datagroups, the data structure identifying an attribute for the respective datagroup, with the data structure having multiple bit locations corresponding to multiple attributes.

Variations of such a system to interface with a data storage device or similar systems to interface with a data storage device can include the data structure comprising one byte having one bit location assigned to one attribute. In various embodiments, the operations can include transmitting a first data structure identifying that the data storage device supports a datagroup protocol. The operations can include transmitting a second data structure identifying granularity of the datagroup.

Figure 13:
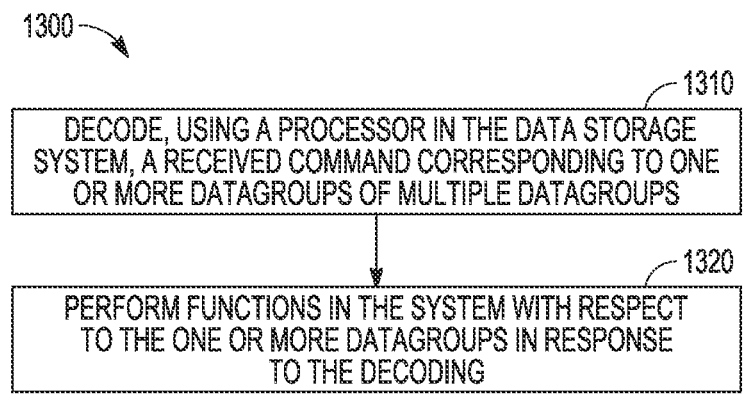
FIG. 13 a flow diagram of an example method of dynamically updating data information in a data storage system, according to various embodiments.

FIG. 13 is a flow diagram of an embodiment of an example method 1300 of dynamically updating data information in a data storage system. The data storage system can be implemented similar to the storage device 610 having the processing device 615 with the memory 616 of FIG. 6. At 1310, a received command, corresponding to one or more datagroups of multiple datagroups, is decoded using a processor in the data storage system, such as the processing device 615 in the storage device 610. The multiple datagroups are contained in one or more memory devices of the data storage system. The received command can be a request for the data storage system to receive a datagroup attribute table, where the datagroup table has data attributes for the multiple datagroups.

The received command can include a data structure for each datagroup of a specified number of datagroups, with the data structure identifying an attribute for the respective datagroup. The data structure can include multiple bit locations corresponding to multiple attributes. In various embodiments, the data structure can comprise one byte having one bit location assigned to one attribute.

At 1320, functions in the system with respect to the one or more datagroups are performed in response to the decoding. Performing functions can include storing a mapping table decoded from the command, with the mapping table being an assignment of attributes to the datagroups. Functions can include reorganizing data in the data storage device.

Variations of method 1300 or methods similar to the method 1300 can include a number of different embodiments that may be combined depending on the application of such methods and/or the architecture of systems in which such methods are implemented. Such methods can include extracting, from a first received data structure, an indicator that the system supports a datagroup protocol; and extracting, from a second received data structure, an indicator of datagroup granularity.

In various embodiments, a system for data storage can comprise: one or more memory devices containing multiple datagroups with a datagroup being a grouping of a range of local block addresses and a processor configured to execute instructions stored on one or more components in the system, which instructions, when executed by the processor, cause the system to perform operations. The operations can comprise: decoding a received command corresponding to one or more datagroups of the multiple datagroups; and performing functions in the system with respect to the one or more datagroups in response to the decoding.

Variations of such a system for data storage or similar systems for data storage can include a number of different embodiments that may be combined depending on the application of such systems and/or the architecture in which such systems for data storage are implemented. Such systems can include the received command being a request for the system for data storage to receive a datagroup attribute table. The received command can include data attributes for the multiple datagroups. Performing functions can include storing a mapping table decoded from the command, with the mapping table being an assignment of attributes to the multiple datagroups.

Variations of such systems can include the received command having a data structure for each datagroup of a specified number of datagroups, with the data structure identifying at least one attribute for the respective datagroup. The data structure can include multiple bit locations corresponding to multiple respective attributes. In various embodiments, the data structure can comprise one byte having one bit location assigned to one attribute. Such an assignment can be a one-to-one assignment of an attribute to a bit location for all attributes being dynamically updated in the data storage. Depending on the manner of providing changed attributes, the updating can include providing attributes that are not being changed along with the attributes being changed. The data structure can include six bit locations with a bit location to identify a temporary write attribute, a bit location to identify a read only attribute, a bit location to identify a sequential access attribute, a bit location to identify a fast access attribute, a bit location to identify a cold attribute, and a bit location to identify a hot attribute.

Variations of such a system for data storage or similar systems for data storage can include the processor arranged to execute operations that include extracting, from a first received data structure, an indicator that the system supports a datagroup protocol. The operation can include extracting, from a second received data structure, an indicator of datagroup granularity.

The following are example embodiments of systems and methods, in accordance with the teachings herein.

An example system 1 for data storage can comprise: one or more memory devices containing multiple datagroups with a datagroup being a grouping of a range of local block addresses; and a processor configured to execute instructions stored on one or more components in the system, which instructions, when executed by the processor, cause the system to perform operations, the operations comprising: decoding a received command corresponding to one or more datagroups of the multiple datagroups; and performing functions in the system with respect to the one or more datagroups in response to the decoding.

An example system 2 for data storage can include features of example system 1 for data storage and can include the received command being a request for the system for data storage to receive a datagroup attribute table.

An example system 3 for data storage can include features of any of the preceding example systems for data storage and can include the received command to include data attributes for the multiple datagroups.

An example system 4 for data storage can include features of any of the preceding example systems for data storage and can include the received command to include a data structure for each datagroup of a specified number of datagroups, the data structure identifying at least one attribute for the respective datagroup.

An example system 5 for data storage can include features of example system 4 for data storage and any of the preceding example systems for data storage and can include the data structure to include multiple bit locations corresponding to multiple respective attributes.

An example system 6 for data storage can include features of example system 5 for data storage and any of the preceding example systems for data storage and can include the data structure to comprise one byte having one bit location assigned to one attribute.

An example system 7 for data storage can include features of example system 5 for data storage and any of the preceding example systems for data storage and can include the data structure to include six bit locations with a bit location to identify a temporary write attribute, a bit location to identify a read only attribute, a bit location to identify a sequential access attribute, a bit location to identify a fast access attribute, a bit location to identify a cold attribute, and a bit location to identify a hot attribute.

An example system 8 for data storage can include features of any of the preceding example systems for data storage and can include performing functions to include storing a mapping table decoded from the received command, with the mapping table being an assignment of attributes to the multiple datagroups.

An example system 9 for data storage can include features of any of the preceding example systems for data storage and can include the operations to include: extracting, from a first received data structure, an indicator that the system supports a datagroup protocol; and extracting, from a second received data structure, an indicator of datagroup granularity.

In an example system 10, any of the systems for data storage of example systems 1 to 9 for data storage may include memory devices incorporated into an electronic system further comprising a host processor and a communication bus extending between the host processor and the memory device.

An example system 11 to interface with a data storage device can comprise: a processor configured to execute instructions stored on one or more components in the system, which instructions, when executed by the processor, cause the system to perform operations, the operations comprising: assigning attributes to one or more datagroups of multiple datagroups, the multiple datagroups contained in one or more memory devices of the data storage device, a datagroup being a grouping of a range of local block addresses; encoding the assigned attributes into a command; and transmitting the command to the data storage device.

An example system 12 to interface with a data storage device can include features of example system 11 to interface with a data storage device and can include the command to include a data structure for each datagroup of a specified number of datagroups, the data structure identifying an attribute for the respective datagroup, the data structure having multiple bit locations corresponding to multiple attributes.

An example system 13 to interface with a data storage device can include features of any of the preceding example systems 11 and 12 to interface with a data storage device and can include the data structure to comprise one byte having one bit location assigned to one attribute.

An example system 14 to interface with a data storage device can include features of any of the preceding example systems 11-13 to interface with a data storage device and can include the operations to include: transmitting a first data structure identifying that the data storage device supports a datagroup protocol; and transmitting a second data structure identifying granularity of the datagroup.

In an example system 15, any of the systems of example systems 1 to 14 may include memory devices incorporated into an electronic system further comprising a host processor and a communication bus extending between the host processor and the memory device.

In an example system 16, any of the systems of example systems 1 to 15 may be modified to include any structure presented in another example system 1-15.

In an example system 17, any of apparatus of any of the systems of example systems 1 to 16 may further include a machine-readable storage device configured to store instructions as a physical state, wherein the instructions may be used to perform one or more operations of the apparatus.

In an example system 18, any of the systems of example systems 1 to 17 may be adapted and operated to perform operations in accordance with any of the methods of the following example methods 1-8.

An example method 1 of dynamically updating data information to a data storage system can comprise: decoding, using a processor in the data storage system, a received command corresponding to one or more datagroups of multiple datagroups, the multiple datagroups contained in one or more memory devices of the data storage system; and performing functions in the system with respect to the one or more datagroups in response to the decoding.

An example method 2 of dynamically updating data information to a data storage system can include features of example method 1 of dynamically updating data information to a data storage system and can include the received command being a request for the data storage system to receive a datagroup attribute table, the datagroup attribute table having data attributes for the multiple datagroups.

An example method 3 of dynamically updating data information to a data storage system can include features of any of the preceding example methods of dynamically updating data information to a data storage system and can include the received command to include a data structure for each datagroup of a specified number of datagroups, the data structure identifying an attribute for the respective datagroup.

An example method 4 of dynamically updating data information to a data storage system can include features of example method 3 of dynamically updating data information to a data storage system and features of any of the preceding example methods of dynamically updating data information to a data storage system and can include the data structure to include multiple bit locations corresponding to multiple attributes.

An example method 5 of dynamically updating data information to a data storage system can include features of example method 4 of dynamically updating data information to a data storage system and features of any of the preceding example methods of dynamically updating data information to a data storage system and can include the data structure comprising one byte having one bit location assigned to one attribute.

An example method 6 of dynamically updating data information to a data storage system can include features of example method 5 of dynamically updating data information to a data storage system and features of any of the preceding example methods of dynamically updating data information to a data storage system and can include performing functions to include storing a mapping table decoded from the received command, with the mapping table being an assignment of attributes to the datagroups.

An example method 7 of dynamically updating data information to a data storage system can include features of any of the preceding example methods of dynamically updating data information to a data storage system and can comprise: extracting, from a first received data structure, an indicator that the system supports a datagroup protocol; and extracting, from a second received data structure, an indicator of datagroup granularity.

In an example method 8 of dynamically updating data information to a data storage system, any of the example methods 1-7 of dynamically updating data information to a data storage system may be performed by an electronic system including a host processor and a communications interface extending between the host processor and a memory device.

In an example method 9 of dynamically updating data information to a data storage system, any of the example methods 1-8 of dynamically updating data information to a data storage system may be modified to include operations set forth in any other of method examples 1-8 of dynamically updating data information to a data storage system.

In an example method 10 of dynamically updating data information to a data storage system, any of the example methods 1-9 of dynamically updating data information to a data storage system may be implemented at least in part through use of instructions stored as a physical state in one or more machine-readable storage devices.

An example method 11 of dynamically updating data information to a data storage system can include features of any of the preceding example methods 1-10 of dynamically updating data information to a data storage system and can include performing functions associated with any features of example systems 1-18.

An example machine-readable storage device 1 storing instructions, that when executed by one or more processors, cause a machine to perform operations, can comprise instructions to perform functions associated with any features of example systems 1-18 or perform methods associated with any features of example methods 1-11.

In various examples, the components, controllers, processors, units, engines, or tables described herein can include, among other things, physical circuitry or firmware stored on a physical device. As used herein, "processor device" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, RAMs, ROMs, SSDs, UFS devices, eMMC devices, and the like.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. The above description is intended to be illustrative, and not restrictive, and that the phraseology or terminology employed herein is for the purpose of description. In addition, in the foregoing Detailed Description, it can be seen that various features are grouped together in a single embodiment for the purpose of streamlining the disclosure. Combinations of the above embodiments and other embodiments will be apparent to those of skill in the art upon studying the above description.

What is claimed is:

1. A system for data storage, the system comprising:
one or more memory devices containing multiple datagroups with a datagroup being a grouping of a range of local block addresses; and
a processor configured to execute instructions stored on one or more components in the system, which instructions, when executed by the processor, cause the system to perform operations, the operations comprising:
decoding a received command corresponding to one or more datagroups of the multiple datagroups, the received command identifying at least one attribute of the one or more datagroups;
extracting, from a first received data structure, an indicator that the system supports a datagroup protocol;
extracting, from a second received data structure, an indicator of datagroup granularity; and
performing a function in the system with respect to the one or more datagroups in response to the decoding and the extracting.

2. The system of claim 1, wherein the received command is a request for the system to receive a datagroup attribute table.

3. The system of claim 1, wherein the received command includes data attributes for the multiple datagroups.

4. The system of claim 1, wherein the received command includes a data structure for each datagroup of a specified number of datagroups, the data structure identifying the at least one attribute for the respective datagroup.

5. The system of claim 4, wherein the data structure includes multiple bit locations corresponding to multiple respective attributes.

6. The system of claim 5, wherein the data structure includes one byte having one bit location assigned to one attribute.

7. The system of claim 5, wherein the data structure includes six bit locations having a bit location to identify a temporary write attribute, a bit location to identify a read only attribute, a bit location to identify a sequential access attribute, a bit location to identify a fast access attribute, a bit location to identify a cold attribute, and a bit location to identify a hot attribute.

8. The system of claim 7, wherein the data structure includes two additional bit locations set as reserved locations.

9. The system of claim 1, wherein performing the function includes storing a mapping table decoded from the received command, with the mapping table being an assignment of attributes to the multiple datagroups.

10. The system of claim 1, wherein the indicator in the first received data structure that the system supports a datagroup protocol is disposed in bit location ten of a thirty-two bit data structure.

11. A method of dynamically updating data information to a data storage system, the method comprising:
decoding, using a processor in the data storage system, a received command corresponding to one or more datagroups of multiple datagroups, the multiple datagroups contained in one or more memory devices of the data storage system, the received command including an identifier of at least one attribute of the one or more datagroups;
extracting, from a first received data structure, an indicator that the data storage system supports a datagroup protocol;
extracting, from a second received data structure, an indicator of datagroup granularity; and
performing a function in the data storage system with respect to the one or more datagroups in response to the decoding.

12. The method of claim 11, wherein the received command is a request for the data storage system to receive a datagroup attribute table, the datagroup attribute table having data attributes for the multiple datagroups.

13. The method of claim 11, wherein the received command includes a data structure for each datagroup of a specified number of datagroups, the data structure identifying an attribute for the respective datagroup.

14. The method of claim 13, wherein the data structure includes multiple bit locations corresponding to multiple attributes.

15. The method of claim 14, wherein the data structure comprises one byte having one bit location assigned to one attribute.

16. The method of claim 11, wherein performing the function includes storing a mapping table decoded from the received command, with the mapping table being an assignment of attributes to the one or more datagroups.

17. A system to interface with a data storage device, the system comprising:
a processor configured to execute instructions stored on one or more components in the system, which instructions, when executed by the processor, cause the system to perform operations, the operations comprising:
assigning attributes to one or more datagroups of multiple datagroups, the multiple datagroups contained in one or more memory devices of the data storage device, a datagroup being a grouping of a range of local block addresses;
encoding the assigned attributes into a command;
transmitting the command to the data storage device;
transmitting a first data structure identifying that the data storage device supports a datagroup protocol; and
transmitting a second data structure identifying granularity of the datagroup.

18. The system of claim 17, wherein the command includes a data structure for each datagroup of a specified number of datagroups, the data structure identifying an attribute for the respective datagroup, the data structure having multiple bit locations corresponding to multiple attributes.

19. The system of claim 18, wherein the data structure comprises one byte having one bit location assigned to one attribute.

20. The system of claim 17, wherein the command includes a list of multiple entries of data structures arranged as an allocation length in the command, each data structure containing bit locations identifying attributes for the respective datagroup for a given one of the one or more datagroups different from the other ones of the one or more datagroups.

* * * * *